3,043,748
FERMENTATION OF SUCROSE BY
ASPERGILLUS FLAVUS-ORYZAE
Harold E. Kistner, Sr., Omaha, Nebr.
(504 10th St., Sheldon, Iowa)
No Drawing. Filed May 26, 1960, Ser. No. 31,833
3 Claims. (Cl. 195—36)

This invention relates to a new fermentation product and to the processes for its production.

The fermentation product of this invention has been found to have a wide variety of uses and properties; among which are: a growth factor activating substance; a growth factor for yeasts; a preservative for the treatment of vegetables, grains and forages being subjected to preservative fermentation processes; and as a nutrient transport material for animal nutrition.

It has been recognized that various strains of fungi through their metabolic processes produce certain substances which have been called growth factors, because the addition of small amounts of these substances to animal diets provides a greatly increased rate of growth in such animals. However, in making controlled feeding tests to test the effectiveness of such growth factors, wide variations in the results have occurred which have not been explicable in terms of the quantitative or qualitative properties of the growth factor substance.

The fermentation product of the present invention has been found to serve as a growth factor activating substance which, when combined with the various growth factor substances, insures the positive and controlled functioning of the growth factor at an optimum and predictable rate. It has been found that this growth factor activating substance is normally produced by the same fungi which produce the growth factor substance, but that the activating substance is also consumed by these same fungi during certain phases of their metabolic processes and therefore has been present in the filtrate or substrate containing the growth factor substance in only minimal and unpredictable quantities. The present invention allows the predictable and controlled production of this growth factor activating substance from fungi under conditions which prevent or minimize the consumption of the growth factor activating substance by the fungi so that this substance remains in the filtrate in greatly increased amount and can be readily recovered therefrom and prepared as a standardized substance for use with the growth factor substance as a nutritional additive.

It has also been found that the fermentation product obtained according to the teachings of this invention is able to act as a preservative material when added to vegetable materials being preserved by the fermentation processes. The fermentation product is added at the beginning of the preservative process, and inhibits the growth of putrefactive organisms causing decomposition and the production of undesirable substances in the vegetable material, while improving the preservative fermentation process itself by increasing the rate of production of desirable ensilage products such as lactic acid.

The fermentation product of this invention is also able to serve as a growth factor for yeasts. The fermentation product is added directly to the medium in which the yeast is being grown and serves to stimulate the growth and increase the yeast population at a much more rapid rate.

This fermentation product also acts as a nutrient transport material in various animals, particularly in the case of fowl. Not only does the fermentation product produce increased growth rate, but also provides increased pigmentation in the fowl when added to standard feeding rations.

The process for producing this novel fermentation product may be carried out in two different ways, depending upon the intended use for the product. In the first of these, the fungus is grown to a maximum mycelial growth in a first nutrient solution or culture medium designed to produce a maximum rate of growth, after which the filtrate is removed and replaced by a different nutrient solution in which the fermentation for the production of this fermentation product takes place. In the other process for producing this fermentation product the fungus is grown in the first nutrient solution to produce maximum mycelial growth, after which the composition of the culture medium is modified without removal of the filtrate into a solution which allows fermentation to produce the fermentation product of this invention.

It has been found that certain strains of the *Aspergillus flavus-oryzae* group of fungi produce optimal amounts of this fermentation product when grown and treated according to these processes. One of the strains which have proven very effective is NRRL 458, a culture of which is on deposit at the Northern Utilization Branch at Peoria, Illinois. However, it has also been found that the production of this fermentation product is not limited to any specific fungus, and that certain strains of other fungi such as *Aspergillus wentii* and *Aspergillus tamarii* are also capable of forming this fermentation product in sufficient quantities under these processes to be economically feasible.

The isolation and identification of the strains of fungi for the production of this fermentation product may be accomplished by the following method. Materials which may be a source of the desired strains of fungi are plated out on a suitable bacteriological medium favorable for the development of fungi. A suitable medium for this use is Czapek-Dox medium with agar. This medium consists of: $NaNO_3$, 3 grams; $K_2HPO_4$, 1 gram; $MgSO_4.7H_2O$, 0.5 gram; $KCl$, 0.5 gram; $FeSO_4.7H_2O$, 0.01 gram; sucrose, 30.0 grams and agar 15.0 grams in 1 liter of water. The medium is sterilized at 15 pounds pressure for 15 minutes. The material is then plated out on this medium and allowed to incubate for two to three days at 25° C. The various colonies of fungi can then be easily detected by a trained observer, and are picked from the medium and transferred to test tubes with the same medium or any other medium suitable for their growth. Pure cultures are obtained in this manner. These cultures are then grown in a liquid medium having the composition and under the conditions outlined hereinafter in this specification. The medium is then checked for this fermentation product in the manner described hereinafter after various intervals of incubation at 25° to 35° C. Those strains which under the conditions of these processes give rapid growth and show a strong production of the fermentation product to the exclusion of undesirable products are then selected for the purposes of quantity production.

The carbohydrate to nitrogen ratio present in the culture medium during the growth stages is of great importance to the ability of the strains of fungi to form the fermentation product. In general, the lower the carbohydrate to nitrogen ratio, the lesser is the capacity of the fungi to produce the fermentation product, and conversely, up to a certain maximum, a higher ratio is more favorable for the ability to produce the fermentation product. These ratios expressed as carbon to nitrogen ratios have been ascertained to range between 25:1 and 500:1, respectively. The most favorable sources of nitrogen have been found to be sodium nitrate, and various salts of ammonia as well as urea and other nitrogen compounds.

As it is highly important to balance the nitrogen concentration in the first nutrient solution or culture medium, it has been determined that for example, the presence of 200 milligrams to 500 milligrams of nitrogen per liter of culture medium containing 50 to 150 grams of carbohydrate material gives favorable results. Maximum mycelial growth is produced, and subsequent fermentation yields maximum production of this fermentation product.

Various carbohydrates may be used as the carbon source in the culture medium. Natural sugars such as sucrose have been found to be an excellent carbon source, and these sugars need not necessarily be highly purified, but may be supplied from various sources, providing they are not contaminated by impurities which may interfere with the production of or render inactive the fermentation product. The other constitutents of the culture medium besides the carbohydrate as a source of carbon, comprise various nutrient mineral salts. These mineral salts may be used in various combinations and concentrations, of which the following represents a typical combination: $NaNO_3$, 0.28%; $K_2HPO_4$, 0.093%; $MgSO_4 \cdot 7H_2O$, 0.046%; $KCl$, 0.046%; and $FeSO_4 \cdot 7H_2O$, 0.00096%. This culture medium may be adjusted to allow for the presence of mineral salts in the carbohydrate source, if a crude or impure source of carbohydrate is used.

The culture medium corresponding to the above combination is used for the first stage during which the initial growth of the organism takes place. For the subsequent or second stage of fermentation in which the fermentation product of this invention is produced, the culture medium is the same as above but with increased carbohydrates and without the sodium nitrate. The proper strains of fungi selected as stated above can be grown rapidly and abundantly in a submerged condition in large containers corresponding to tank conditions. The culture medium is given rapid aeration and agitation under air pressure to insure a sufficient oxygen supply. The rate of growth under these conditions is greatly accelerated. The advantages of deep tank cultures over either tray cultures or shallow pan cultures are obvious, although it is possible to also produce this fermentation product by these methods under favorable conditions.

Although, as has been mentioned previously, the fermentation product may be produced without removal of the culture medium used for the initial growth of the fungus, maximum yield of the fermentation product is obtained by removing the culture medium used for the initial growth stage and replacing it with the same solution described above less the sodium nitrate. The fermentation by the adult fungus in the second medium having a high amount of carbohydrate and little or no available nitrogen produces the fermentation product of this invention.

The filtrate resulting from the first growth stage giving the maximum mycelial growth of the fungi will carry various growth factors useful for animal nutrition. The second stage filtrate obtained after full fermentation of the second nutrient solution by the adult fungus contains the fermentation product of this invention in highly concentrated form without the presence of the growth factors, which are produced by the fungi only during their initial stages of growth in the presence of available nitrogen.

Where the fermentation product is to be used as a growth factor for yeasts or as a preservative material for substances being preserved through fermentation processes, the second filtrate alone will be used, and any contamination by the growth factor and other materials in the first filtrate is detrimental. However, when the fermentation product is to be used for nutritional purposes, it may be mixed with the first filtrate so that the fermentation product will serve both as a growth factor activating substance for the growth factors present in the first filtrate and as a nutrient transport material.

In the latter case, the alternative process may be employed in which the initial mycelial growth of the fungus takes place in the solution noted above until substantially all of the nitrogen has been consumed in the growth of the fungus and the latter has reached a full adult stage. After this is done, a second solution corresponding to the initial one less the nitrogen containing compounds is added and the fermentation of this solution together with nutrients remaining from the original solution is allowed to proceed. Since the first stage filtrate was never removed, the growth factor substance produced during the initial growth of the fungus is present together with the fermentation product of this invention, although the concentration and amount of the fermentation product produced will be somewhat lessened due to interference by any remaining available nitrogen and the growth factor substances.

The optimum temperature for growth of the fungi is from 28 to 35° C. However, the fermentation during the second stage is best conducted at about 28° C. The point of maximum growth of the fungus can be empirically observed by the extent of proliferation, or it can be ascertained by the amount of nitrogen consumed. It is only after the maximum growth of the fungus has been reached that the culture medium is changed to produce the fermentation product of this invention.

The fermentation product present in the second filtrate may be utilized in a variety of ways, depending upon the intended purpose. When it is to be used for feeding purposes as a growth factor activating substance, the filtrate is removed and added directly to a base material such as wheat products or other suitable carrier. This mixture is prepared in proportions of one part of carrier and one part of filtrate by weight, and is then dried at relatively low temperatures, below 45° C. by a forced air draft. When the mixture has been fully dried, the fermentation product will be mixed with the carrier in relatively concentrated form and then can be readily added to appropriate feeding rations.

The fermentation product may be used for preserving silage by adding the filtrate directly to the material in the silo. Alternatively, the fermentation product may also be used in the preservation of such items as pickles and sauerkraut by adding a small amount of the filtrate to the pickling solution.

When the second stage filtrate is evaporated directly, the fermentation product is left behind as a viscous mass with no apparent sign of crystallization even on long standing. Efforts to change this product by buffering during fermentation through the addition of such materials as calcium carbonate have been found to adversely affect the production of the fermentation product and if present in sufficient quantities, these materials may so alter the nature of the fermentation product as to render it useless for the intended purposes.

In testing the activity of the fermentation product as a bacteriostatic agent, by adding it to cultures of various organisms, it has been found that the fermentation product is bacteriostatic against gram negative organisms, but does not appear to inhibit the growth of gram positive organisms. When the fermentation product is added to the foodstuffs for animals in quantities normally used for their nutritional and growth needs, the substance produces a feeling of contentment evidenced by a lack of nervousness, indicating the supplying of a lacking nutrient. The animals tend to become more tranquil and lose the air of elusiveness generally characteristic of farm animals.

In making tests to determine the proper strains of the fungus to be used to make the fermentation product, as stated above, the following test has proved the most reliable. The cultures as grown above on the Czapek-Dox medium are isolated and allowed to grow to maturity, after which they are allowed to ferment the nutrient solution in the absence of available nitrogen to produce the second stage filtrate. A mixture is then prepared of 0.25 gram of wheat middlings with 10 cc. of distilled water. This mixture is sterilized and inoculated with a given amount of yeast and one-half drop of the second stage filtrate and run against a similar mixture without the added filtrate as a control. Both mixtures are incubated at 25° C. to 35° C. in gas collection tubes and comparative readings taken of the amount of gas produced. It has been found that the cultures producing the greatest amount of gas according to this test have the optimum ability to produce the fermentation product of this invention. To standardize the amount of the product to be used for optimum results, variations in the amount of the second filtrate added may be made by serial dilutions and the gas formation used as a criterion. There is a direct relationship between yeast growth stimulation, growth factor activating ability and preserving ability.

The following are illustrative examples showing the processes by which the fermentation product of this invention may be produced. It is understood that these examples are merely illustrative of suitable processes and are not to be construed as limiting the scope of the invention.

*Example I*

A first stage culture solution, containing sucrose or other suitable carbohydrate, or a mixture of carbohydrates providing a concentration of about 3% total carbohydrate is supplemented with the above described nutrient salts and trace elements and then sterilized by heat. The culture medium is adjusted to have a pH range between 7 and 8. This culture solution is then inoculated with a selected pure strain of *Aspergillus flavus-oryzae*. This inoculation may be effected by means of either the fungal spores or by a predeveloped suspension of germinated spores. The culture is then incubated at about 25° C. to 35° C. to allow growth to take place at a maximum rate.

Although any method for growing this culture may be used, best results are generally obtained using a deep culture method in vats. With the deep culture method, the medium is aerated using any of the usual methods suitable for this purpose. Under optimum conditions, the length of time required for optimum growth of the culture is about 36 hours.

When optimum growth has taken place, as may be determined by observation of the mycelial growth or by consumption of nitrogen, the resulting filtrate has a pH range between 3 and 4 and is then either siphoned off or filtered off and may be held for further processing to obtain the various growth factors present in this filtrate. The mycelium is then washed back into the fermenter with sterile water and the second stage culture medium is added. This second stage culture medium is similar to the one used for the first stage, having a pH range between 7 and 8, except that it contains no sodium nitrate or other source of available nitrogen and the sucrose or carbohydrate concentration is increased to a range of between 20 and 25% total carbohydrate. The fermentation is allowed to proceed at a temperature of about 28° C. with continued aeration for about an additional 36 hours or until maximum production of the fermentation product has been reached. When this second or fermentation stage is complete, substantially all of the available carbohydrate will have been consumed and the culture medium will have a pH in the range of 2 to 4. The second stage filtrate is then removed by the same methods as employed for the first stage filtrate, and is used or processed according to the methods previously described. The second or fermentation stage may be repeated with the adult fungi a number of times using a fresh supply of the second culture solution until the enzyme system of the mycelium has been depleted.

*Example II*

The first stage culture medium is prepared as described in Example I with the exception that the initial concentration of total carbohydrate is increased to a total of between 20 to 25%. In the first stage, both mycelial growth and fermentation will take place, and when completed, the filtrate is removed in the same manner. In this process, the first stage filtrate will contain both the usual growth factor substances and the fermentation product of this invention. The fermentation product will be present in small amounts under these circumstances because the greater carbohydrate concentration provides a much higher carbohydrate to nitrogen ratio, thereby allowing some production of the fermentation product.

After the first stage filtrate has been removed, the second stage culture medium, having a high carbohydrate concentration and no available nitrogen, may be added and subsequent fermentations carried on in the same manner as in Example I. The second stage filtrates produced according to this process will be substantially the same as and can be used in the same manner as the second stage filtrate according to Example I.

*Example III*

The several successive steps of the first or growth stage of the process as described in Example I are followed excepting that a suitable cheap source of carbohydrate is used in place of the pure sucrose or other sugars, and the nutrient salt addition is modified to take account of the presence of these elements as impurities in the crude carbohydrate, as determined by chemical analysis.

The crude carbohydrate material is diluted with water to afford a concentration of from 3 to 5% of the total as pure carbohydrate content depending upon the physical nature of the crude material. The growth stage is completed and the first filtrate removed as in Example I. The following fermentation stages are accomplished as in Example I using the culture medium described therein employing pure sugars and nutrient salts.

It is understood that the processes illustrated in the above examples may be modified as will become apparent to those skilled in the art, without departing from the scope of the invention as defined in the appended claims.

What is claimed is:

1. A process for preparing a growth promoting substance by the fermentation of sucrose by fungi of the species *Aspergillus flavus-oryzae* comprising the steps of inoculating the fungi in a sucrose solution containing inorganic nutrient materials providing a carbon to nitrogen ratio between the ranges of 25 to 1 and 500 to 1, said solution having an initial sucrose concentration between 3 and 5% of the total by weight, developing maximum mycelial growth at a temperature range between 24° C. and 35° C. until the available nitrogen is substantially depleted, and thereafter supplying the developed mycelium with a second solution containing inorganic nutrient materials and sucrose, the sucrose being present in an amount of at least 20% of the total by weight, conducting the fermentation of said second solution in a substantial absence of available nitrogen at about 28° C. to substantial completion, and thereafter removing from the fermented solution the filtrate containing the growth promoting substance.

2. The growth promoting substance produced by the process of claim 1.

3. The process set forth in claim 1 wherein the fungi of the species *Aspergillus flavus-oryzae* are of the strain NRRL 458.

References Cited in the file of this patent

UNITED STATES PATENTS

| | | |
|---|---|---|
| 1,849,053 | Bernhauer et al. | Mar. 15, 1932 |
| 2,906,670 | Borrow et al. | Sept. 29, 1959 |
| 2,906,671 | Borrow et al. | Sept. 29, 1959 |